J. C. VAN AKEN.
SLED.
APPLICATION FILED JUNE 1, 1912.
1,098,650.
Patented June 2, 1914.
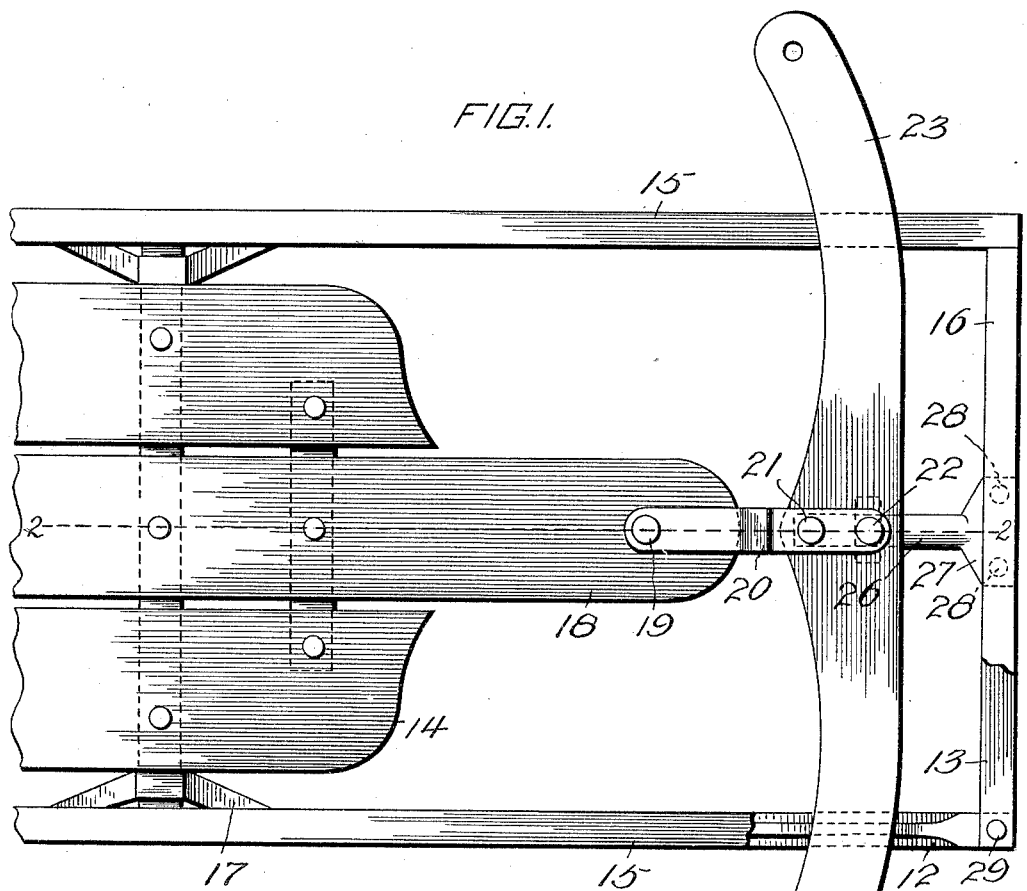
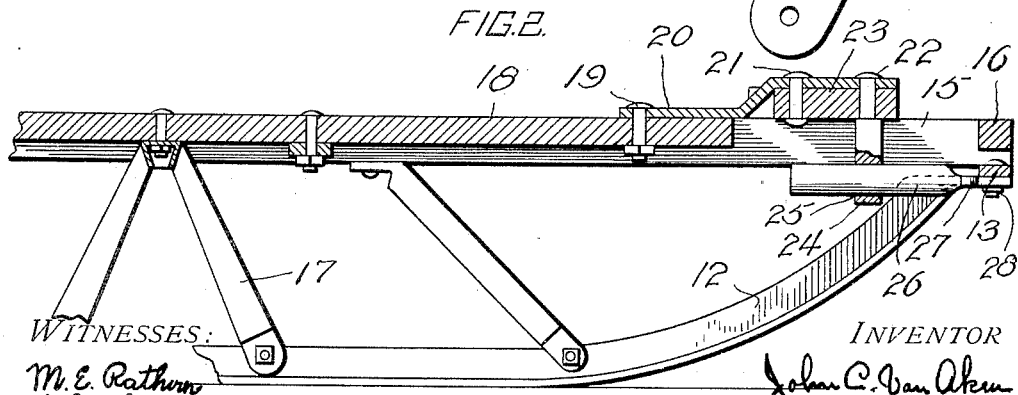

UNITED STATES PATENT OFFICE.

JOHN C. VAN AKEN, OF RIDGWAY, PENNSYLVANIA.

SLED.

1,098,650.  Specification of Letters Patent.  Patented June 2, 1914.

Application filed June 1, 1912. Serial No. 701,035.

*To all whom it may concern:*

Be it known that I, JOHN C. VAN AKEN, a citizen of the United States, residing at Ridgway, in the county of Elk and State of Pennsylvania, have invented or discovered certain new and useful Improvements in Sleds, of which the following is a specification, reference being had therein to the accompanying drawings.

This invention relates to sleds of the type having flexible runners provided with means for turning said runners laterally for the purpose of steering the sled, the same being in the nature of a modification of the construction shown and described in Letters Patent No. 1,040,061 granted to me October 1, 1912.

The invention has for its object to provide improved steering means for laterally flexing the runners which will permit a wide range of movement without permitting any lost motion or looseness of the parts in any position, and without necessitating the use of members, other than the usual steering bar, which project beyond the normal outline of the sled. These and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention may be embodied in other forms without departing from the spirit and scope thereof.

In said drawings: Figure 1 is a top plan view of the sled, partly broken away, showing the parts in normal position. Fig. 2 is a longitudinal section on the line 2—2, Fig. 1.

Referring to the drawings, 12 denotes the runners, preferably in the form of resilient steel bars of a suitable cross section. Said runners extend parallel to one another and are curved upwardly at their forward ends in the usual manner, said forward ends being connected by a cross bar 13 pivoted thereto at 29. The top or body of the sled comprises a suitable platform 14 and a frame composed of side bars 15, above and normally parallel to the runners 12, and rigidly connected at their forward ends by a cross piece 16 immediately above and parallel to the bar 13. Said top or body as a whole is supported from the runners 12 by a framework 17 of any suitable construction.

The platform 14 is preferably provided with a forwardly extending tongue 18 to which is pivoted, as at 19, a link or strap 20 rigidly secured, as by bolts 21 and 22, to a steering bar 23 extending crosswise of the sled immediately above the side bars 15. The steering bar 23 and connecting bar 13 are operatively connected by means preventing relative lateral movements thereof in any position, but permitting relative angular movement and relative sliding movement longitudinally of the sled, so that as the steering bar 23 is moved about the pivot 19 the bar 13 will be moved laterally without, however, developing any lost motion between said two bars in any position thereof. To this end, in the form of the invention shown, the following construction is provided. The bolt 22 connecting the link or strap 20 with the steering bar 23 is rotatively mounted in said steering bar, and is provided beneath the same with a head 24 having a guiding opening 25 therethrough. The bar 13 is provided with a rearwardly extended portion in the form of a stem 26 guided in the opening 25, and having a flattened head 27 rigidly secured to the bar 13, as by rivets 28.

In operation, as the steering bar 23 is turned upon the pivot 19 it is moved bodily transversely of the sled on an arc concentric with said pivot, carrying with it the stem 26 and bar 13, and laterally flexing the runners, the bolt 22 turning in the steering bar 23 to provide for the relative angular movement of the two bars and the stem 26 sliding in the opening 25 to accommodate the relative movement thereof longitudinally of the sled, said angular and longitudinal movements being caused by the curved path in which said steering bar travels.

With the construction shown and described it will be observed that the lateral movement of the steering bar, and consequently of the runners, is not limited by the angular position of said bar, so that a wide range of movement may be given thereto. This is for the reason that the head 24 turns freely in the steering bar and the stem 26 slides freely in the head, while said stem 26 may be extended or lengthened toward the rear of the sled to any desired degree without interference with the sled construction, and without presenting an unsightly appearance or projecting beyond the front edge of the sled proper. Moreover it will be observed that the operative connection between the steering bar and runners is a positive one in all lateral positions of the parts, inasmuch as the engagement of the stem 26 in the guide opening 25 serves to prevent relative lateral movement of the bars 13 and 23, so that there is no lost motion whether the steering bar be in its normal central position or in a turned position, thus insuring the reliable control of the sled through the steering bar at all times. This provision overcomes an objection to certain forms of sleds of this general type as heretofore constructed, in which the means connecting the steering bar and runners are of such a character that in order to permit the desired range of movement of the parts it is necessary so to construct the connections that when in normal position a certain amount of lost motion is permitted, thereby making it impossible to hold the runners steady by means of the steering bar.

Having thus described my invention, I claim:

1. A sled comprising parallel, laterally flexible runners, a bar connecting the forward ends of said runners, a top or body supported from said runners, a steering bar having a pivotal connection with said top or body, and means connecting said steering bar and connecting bar, said means comprising a stem rigidly secured to said connecting bar, extending rearwardly therefrom, and bodily movable therewith transversely of said top or body, and a head pivoted to said steering bar and in which said stem is guided for longitudinal movement.

2. A sled comprising parallel, laterally flexible runners, a bar connecting the forward ends of said runners, a top supported from said runners, a link pivoted to said top, a steering bar, bolts rigidly connecting said steering bar and link, one of said bolts being rotatably mounted in said steering bar and being provided beneath the same with a head having an opening therethrough, and a stem rigidly secured to said connecting bar, extending rearwardly therefrom, and slidably engaging the opening in said head, said stem being bodily movable with said connecting bar transversely of said top or body.

In testimony whereof I affix my signature, in presence of two witnesses.

JOHN C. VAN AKEN.

Witnesses:
MAY R. CURRY,
WM. A. HAMILTON.